US006721808B1

(12) United States Patent
Singh (10) Patent No.: US 6,721,808 B1
(45) Date of Patent: Apr. 13, 2004

(54) REAL-TIME CREATION OF DISTRIBUTED OBJECT SHELL COMMANDS

(75) Inventor: Bijendra Singh, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 380 days.

(21) Appl. No.: 09/661,113

(22) Filed: Sep. 13, 2000

(51) Int. Cl.[7] ................................................. G06F 9/00
(52) U.S. Cl. ...................................... 709/320; 717/139
(58) Field of Search .............................. 709/315–320; 717/115–119, 136–139

(56) References Cited

U.S. PATENT DOCUMENTS

| | | | | | |
|---|---|---|---|---|---|
| 5,708,838 A | * | 1/1998 | Robinson | .................... | 709/202 |
| 5,812,843 A | * | 9/1998 | Yamazaki et al. | .......... | 709/100 |
| 5,826,088 A | * | 10/1998 | Sitbon et al. | ................ | 717/139 |
| 5,828,851 A | * | 10/1998 | Nixon et al. | ................. | 710/105 |
| 5,828,883 A | * | 10/1998 | Hall | ............................ | 717/133 |
| 6,025,836 A | * | 2/2000 | McBride | ..................... | 345/750 |

* cited by examiner

*Primary Examiner*—John Follansbee
*Assistant Examiner*—Phuong Hoang
(74) *Attorney, Agent, or Firm*—Sierra Patent Group, Ltd.

(57) ABSTRACT

A client system having a unique object interfacing command shell is disclosed, where the object interfacing command shell allows users to dynamically specify remote objects as commands on a command line. Further, the parameters on the command line are the methods or functions of the remote object. Having the ability to both dynamically create commands and to have a syntactically consistent way of accessing remote objects' methods and functions, without having to know details of the objects' calling interfaces, allows considerable freedom to use remote objects in a fast changing, dynamic context in complex network configurations, and allows less technically sophisticated users to use the objects in scripts and at the command line.

10 Claims, 4 Drawing Sheets

REAL-TIME CREATION OF DISTRIBUTED OBJECT SHELL COMMANDS

BACKGROUND OF THE INVENTION

1. Field of the Invention

This invention pertains generally to software applications designed for client-server use. More particularly this invention is directed to an improved system and method for providing automated remote object application support in a client-server object oriented environment.

2. The Prior Art

The client/server model is an approach to providing user-requested services or information. In the traditional client/server environment the client and the server are on the same machine or different physical machines connected by a network. The client asks for and receives services from the server. The client and the server are independent software applications; a client/server system would include those applications plus the operating systems on which each run, networking, and any related applications (such as a database).

The typical client/server model is based on computing as seen from the end user's viewpoint, not that of the system or the application. Thus, the client is the application a user interacts with directly, whereas the server application, responding to requests from the client, is typically invisible to the user. Data presentation is for the benefit of the user, so the client application typically does most of the data-presentation-related computing in addition to some data manipulation. The server application typically does all the work associated with data collection and retrieval; large databases, for example, reside on servers.

The definition of client/server highlights the fundamental tasks each component in the client/server architecture must perform. Understanding required functionality gives insight into the software complexity of the client/server components.

Looking at the client component again, the client acts as the user entry point into the client/server environment. The client must have a user interface component, either GUI or CLUI. The user interface component must include the ability to parse input commands, represent data in whatever form the interface makes available to a user, keep any needed context for the duration of this session, and keep and use context-sensitive history data of interface usage. Thus, the client application must include full UI support.

In addition, client applications carry out some data manipulation locally. The minimal amount of local data manipulation may be restricted to managing a cache so that recently retrieved information can be reused or recalled without needing to go to the server again. Local data manipulation increases in complexity from there, and often includes generating reports or user-interface representations of data retrieved from one or more servers. If the data is scientific or business modeling data, local data manipulation can be extremely intensive requiring powerful workstations.

Finally, client applications must be able to interact with at least one server. Interacting with any server, whether the server is local or accessible via a network, minimally means the client application program must be able to understand and use the communications protocol being used between the two. Often this is implemented at the session layer of the OSI layered network model, but any particular implementation in a client may require interacting at a lower layer depending on the specific application. If a single client is interacting with more than one server, it is entirely possible the client application will need to access different servers using different protocols, meaning the client application must have been programmed with the protocol knowledge built-in.

In general, the client application manages all of the user interactions which effectively hides the server and the network from the user. This creates the illusion that the entire application is executing without the use of servers or networks. The client application must make this interconnectivity and dependency work seamlessly at the user level.

Briefly, the server is a reactive process which is activated by requests from clients. A server is designed to service requests from any number of clients, so must keep client request context. The server provides requested information, computations, or services other requests from clients. A server does not interact with other servers as a server. If it is determined that a server itself needs information from another server, and this service is to be performed by other than the client, the server then takes on the role of a client and requests information from another server. At that point, the server is now a client. Since the "user" is a machine, the client application will not need to the human user interface portions of a typical client application. It will need all the other components, however. In a traditional setting, a server typically needs a more powerful hardware base than a client, and usually has far more support for secondary storage, multiple network connections, etc.

A very well known example of a client/server implementation is an internet client, or browser, such as Microsoft's Explorer or Netscape's Navigator, interacting over the internet with sites. A server is handling the interactions with the user at any site a user accesses with a browser (client).

In addition to the traditional kinds of data and services available from servers, the advent of object oriented programming has introduced new ones. As is well known in the art, object oriented programming entails defining a set or class of objects, including the objects' content and the operations that may be performed on the object, called functions or methods. In a local application, the objects created and instanced are made visible to, and can be used by, the program itself and other local programs. Objects may also be accessed remotely, that is, objects created and instanced on one machine may be accessing by a program on another machine. Objects accessible on one machine by programs running on another machine became an additional set of services available via client/server applications.

To access remote objects, clients need to make use of the remote object's functions and/or methods. To do this, the client program must have complete and detailed knowledge of both how to access the remote system over a network using some programming methodology, plus the details of how to use each remote object's specific functions and methods, including details on how to pass required arguments to them in the chosen programming paradigm. This creates a significant additional burden to the users of the server; they must learn the minutia of the programming methodology that allows access to server and be able to write client applications. In addition to what must be done for client programs in general, accessing remote objects adds the requirement that a detailed understanding of each remote object's interfaces be known. Note that this detailed knowledge must be known by the client programmer for each and every remote object type the client program may ever access—in a large networked environment this can be an overwhelming task. In addition, if even one remote object changes its interface in any way, even a "small" change, the client application would have to be reprogrammed to match, recompiled and re-installed.

Thus, although it is very desirable for client programs to access remote objects, the overall job is daunting. In addition to requiring the time of a skilled programmer to write the client application initially, there is a continuing maintenance problem with coordinating and tracking changes between every remote object type and every client application that accesses them. With multiple client applications wanting access to multiple remote object types, coordinating changes becomes logistically difficult.

Accordingly, there is need to simply the complexity associated with both the initial implementation of applications who access remote objects, and the maintenance of those applications when changes occur to the remote object's methods and/or functions. The present invention satisfies these needs, as well as others, and generally overcomes the deficiencies found in the background art.

It is therefore a goal of the present invention is to provide a method and system for decreasing the complexity of implementing and using remote objects. It is also a goal to decrease the maintenance activities associated with accessing remote object functions and methods. It is a further goal of this invention to make the remote object's functions and methods readily available to a user.

BRIEF DESCRIPTION OF THE INVENTION

The present invention is a Distributed Command SHell (DCSH) which has several unique properties. The DCSH provides a system and method for allowing users to dynamically (in real-time, from a user's perspective) identify a name and a remote object to which the user wants access. The DCSH, if the object is known, will create an instance of the special class of objects known as a holder-object. The DCSH then creates an entry in a name/holder-object table for this name and just-created holder-object pair. The name/holder-object table has two columns per entry. The first column contains the name the user will use to reference the public object, the second column contains a pointer to the holder-object instance just created. The holder-object, using information in a set of root objects (created when the DCSH is first started), contains all the information needed to access the public (usually remote) object just specified. As soon as this action is completed, the user may use the name at the start of a command line at the DCSH's CLUI, and the DCSH will access the correct remote object.

Parameters to the command line having the remote object's name are used to reference the remote object's methods and/or functions. Parameters are also used for arguments to the methods/functions, if any. This allows a user to make full use of remote object methods/functions without having to know any details of the actual programming interface.

Coupled with the fact that the syntax at the DCSH CLUI is consistent, a powerful tool is created allowing non-programming users access to remote objects' methods/functions, yet still available via scripts and at a CLUI. Thus, an expert, senior programmer can implement the DCSH and then all the other users of the DCSH embodied in the present disclosure can use server object functionality without having to learn a programming language and the details of the programming interface of each object being accessed.

DETAILED DESCRIPTION OF PREFERRED EMBODIMENTS

Person of ordinary skill in the art will realize that the following description of the present invention is illustrative only and not in any way limiting. Other embodiments of the invention will readily suggest themselves to such skilled persons having the benefit of this disclosure.

Figure 1:
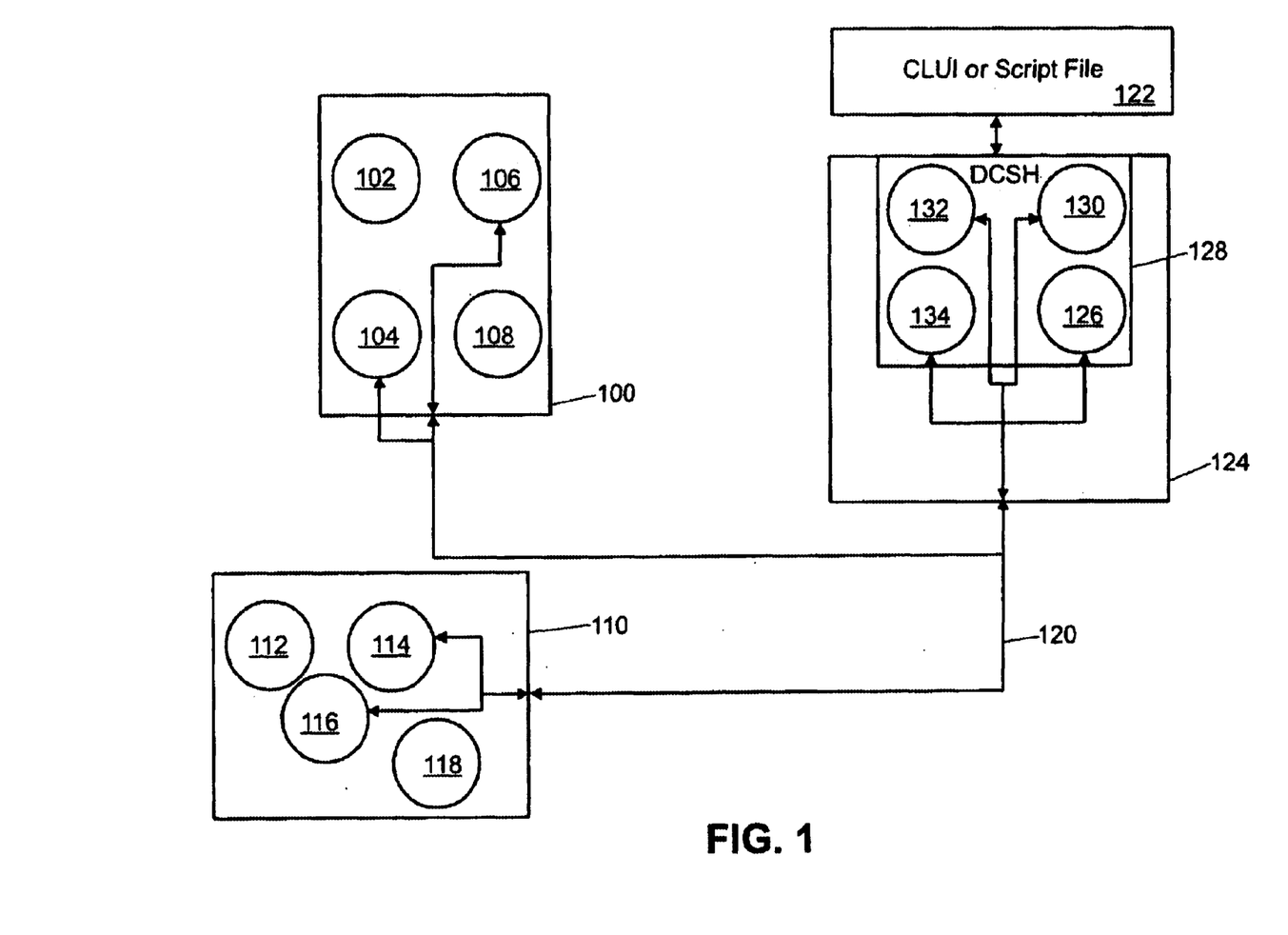
FIG. 1 is a remote object access system according to the present invention.

An overview of the present invention is shown in FIG. 1. Remote object server 100 is shown with externally accessible instantiated objects 102, 104, 106, and 108. Another remote object server, 110, is also shown and has accessible instantiated objects 112, 114, 116, and 118. A person of ordinary skill in the art and with the benefit of the present disclosure will recognize FIG. 1 is but one exemplar of a wide variety of configurations that will work with the present invention, where the number of objects in any particular server as well as the number and location of the servers will vary according to the configuration and availability of hardware and software on each of any number of servers, together with the networking connections available between them and the client machine running the Distributed Command SHell (DCSH).

Servers 100 and 110 are connected over a standard network connection 120 to client system 124. The DCSH 128 is running on client system 124. The network connection 120 between the DCSH 128 on client system 124 and the server systems 100 and 110 is further enabled for use by the DCSH 128 by having one of the standard remote object access protocols available on both client system 124 and each of the servers it communicates with. The present invention can work with CORBA, RMI, RPC, and similar specialized protocol applications supporting remote system and object access. As an example of the functionality provided by these packages and protocols, the technical descriptions of CORBA (Common Object Request Broker Architecture), included specifications and protocols, may be found through Object Management Group's website (www.omg.org). OMG is the governing organization for CORBA, an open-specification, vendor-independent network-based infrastructure which supports remote object access.

The DCSH 128 takes commands from either user-written scripts or individually typed commands at its command line user interface (CLUI) 122. If the commands being issued are for functions or methods on remote objects, the DCSH channels the commands to holder objects corresponding to the call, shown as holder objects 126, 130, 132, and 134. Holder objects are the DCSH's interface between the commands issued by the user (or a user's script) and remote objects. The user issues commands that include a command name and parameters, where the command name corresponds to a remote object and the command parameters correspond to the remote object's method or function interfaces and their arguments, if any. The command line syntax is straightforward and independent of the code and calling details needed to actually access the remote object and its methods and functions. This allows user of the DCSH to learn and use one syntax for their remote object calls, without having to worry about implementation details. How the DCSH accomplishes this and additional functionality is discussed in more detail below.

Although all the public objects (those objects accessible to programs other than the one that created and instanced them) are shown as remote from the DCSH, i.e. the public objects and the DCSH are separated by a network, there can be public objects on the same machine as well. These are called local public objects. The present invention fully anticipates using both local and remote public objects.

Figure 2:
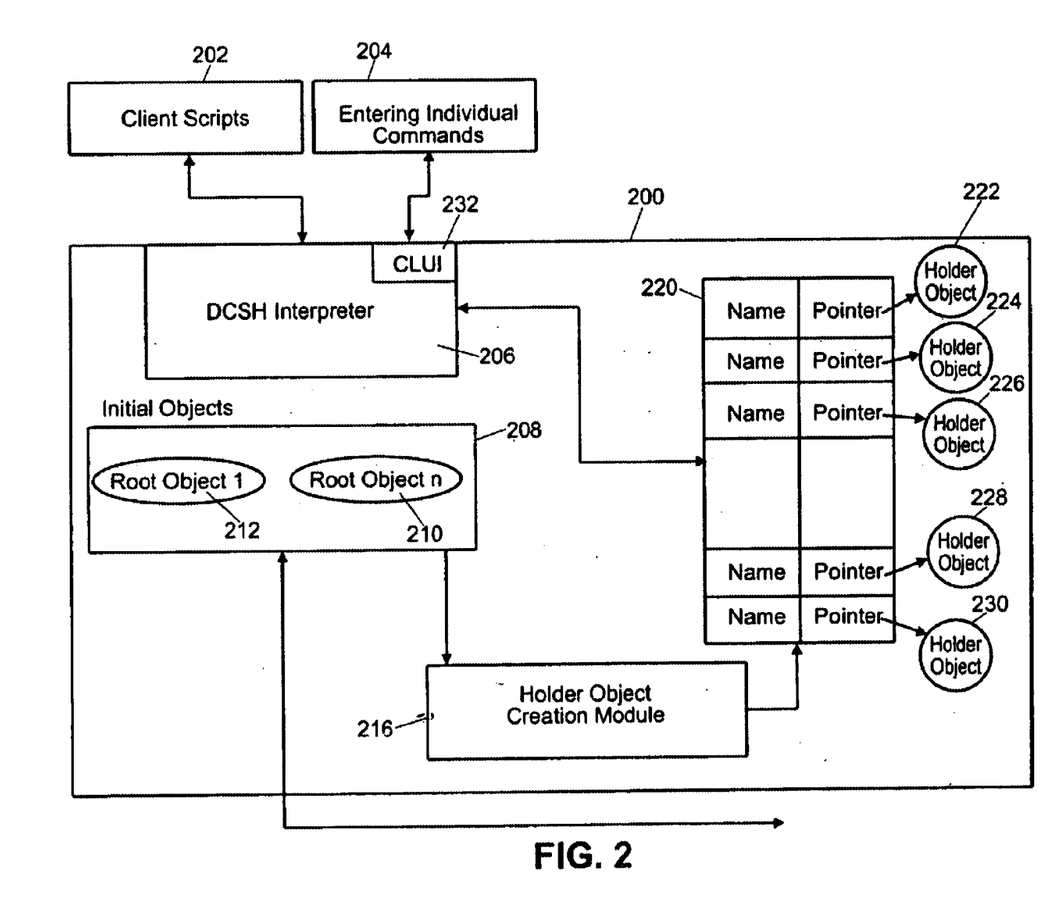
FIG. 2 is a distributed command shell according to the present invention.

Referring now to FIG. 2, the internals of the DCSH 200 are shown in more detail. Input to the DCSH 200 comes primarily from two sources. One is the entry of individual commands shown at box 204. Box 204 will typically be a user entering commands at a keyboard, but other user interfaces will readily come to mind for those of ordinary skill in the art and having the benefit of the present disclosure. The incoming command lines enter the DCSH at the command line user interface (CLUI) 232 at the DCSH command prompt. The other source of commands will typically be script files, written by users. Box 202, representing script files, is providing a command input stream to the DCSH interpreter. It is expected that the heaviest use of the DCSH will be through the use of scripts, as scripts allow for automation of tasks using the DCSH. Such tasks could include everything from automating QA testing for an application or product that is distributed over a network, to network management tasks in large, topologically complicated network.

In the context of this disclosure, a command line interface (CLI) and command line user interface (CLUI) and to be understood as being the same interface into the DCSH, with all the input/output properties associated with each variation of a command line based interface as are well known to a person of ordinary skill in this art.

The DCSH is a general-purpose shell, that provides the interface between local users and remote objects. When the DCSH is first started or initialized it has, amongst other components, the interpreter 206 and a set of initial objects shown in box 208 as 210 and 212. Parsing of scripts or commands for the DCSH is done by the interpreter. The interpreter provides language constructs needed to write useful scripts, provide a CLUI, and supports method and function invocation on public objects through the use of the name/holder-object table. It also contains an error handling mechanism for passes error messages back to the user. The DCSH may be extended to provide commonly used functions using standard libraries depending upon the needs of any particular client application.

There may be any number of initial objects depending on the initialization parameters or startup method a designer chooses, but there will be at least one initial object for each server the DCSH wants to talk to. These initial objects are called root objects for the DCSH. The job of root objects is to establish communication with a server and act as a building block for any further communication between a client and a server. They also provide methods to create other server objects. Any further communication between a client and a server must be through the root objects or through objects created using methods on the root objects. Other root objects include objects that correspond to known remote servers, and as many are created as needed to accommodate the known set of remote servers.

The knowledge of server objects and their public interfaces is provided by using Interface Definition Language (IDL), which publishes the public interfaces for external world use at the direction of the implementers of the server. IDL is a common way of providing object details to the clients in distributed object computing world. Further information on IDL and how it interacts with CORBA may be found at OMG's website (www.omg.org).

If additional remote servers objects are found and used while the DCSH is already up, additional root objects of the remote-server type are created as needed. Each of the remote-server type of root object has the information needed to access the server to which it points.

Methods on a server object (or remote object, an object on a remote or local server, but typically on a remote server) can be invoked from the DCSH only when the target object is already created on the server. This is the reason for "root" objects to be created as part of the DCSH start up process; invoking methods on target objects uses the knowledge of the server held by the root object corresponding to the server where the target object is instantiated. The existence of a root object corresponding to the target object means the target object (again, typically also a remote object) is available. Except for initial ("root") objects, all other local objects corresponding to remote objects are created by invoking methods on already created remote objects. All the knowledge of accessing a remote server object is kept embedded in the DCSH using CORBA, RMI or other similar ways depending upon the implementation may provide access to the server.

The DCSH acts as a client to the server and contains holder objects, which are created by Holder Object Creation Module 216 and internally maintain a reference to an actual server object. Holder objects are used when a method is invoked on a holder object either from CLUI or from a script running in the DCSH environment. The DCSH interpreter parses the request and if found valid, passes the information to the object reference being held in the corresponding holder object. This request is then passed to the actual server object (typically remote) in the form of the underlying implementation. The request gets executed on the server and results returned to the caller, which in turn passes them back to the DCSH. If the request was for invoking a method on an existing server object which creates a new local object (in that case caller is required to provide a name for the new local object to be created) and the server successfully executed it, an object reference is returned to the DCSH. The DCSH then creates a holder object using returned reference and places the {command name, holder object} tuple in its name-object table.

After the remote-server object is created and the association made between the remote object and the server on which it is instantiated, a holder object is created. There is one holder object for each known remote object. The holder object contains all the information needed to access the remote object and return values. This includes a complete catalog of the methods and functions supported by the remote object, the syntax required to invoke each method and each function, and how to access the remote object over the intervening network. If the object is a local public object rather than a remote public object, the basic process is the same with the holder object ending up having less information, as no network access is required. Holder objects, shown as 222 through 230, are each pointed to by a single entry in name-object table 220.

A user will make use of a remote object by using its name in a command line identically to using any other shell command. The DCSH uses the name-object table 220 to find the holder object that corresponds to the name used in the command line. Parameters given with the name being used as a command indicate to the DCSH which method or function to invoke on the remote object. The command is parsed in the DCSH interpreter 206, and name-object table 220 is used to identify the holder object for the name (one of holder objects 224 through 230) which contains all the information needed to use the remote object. The parameters are used by the holder object to invoke the desired aspect of the remote object.

Because the command line is parsed by the DCSH interpreter 206, the command line interface can be made uniform to the user without regard to the actual syntax required by the remote object. This uniform interface makes it enormously easier for a user of the DCSH to invoke any needed remote objects, as the usual problem of discerning the unknown syntax of new objects is removed. As long as the public interfaces on the server objects remain unchanged, implementation changes on the server or the DCSH do not force any changes to client scripts created for the DCSH. The scripts need not be recompiled or changed.

Figure 3:
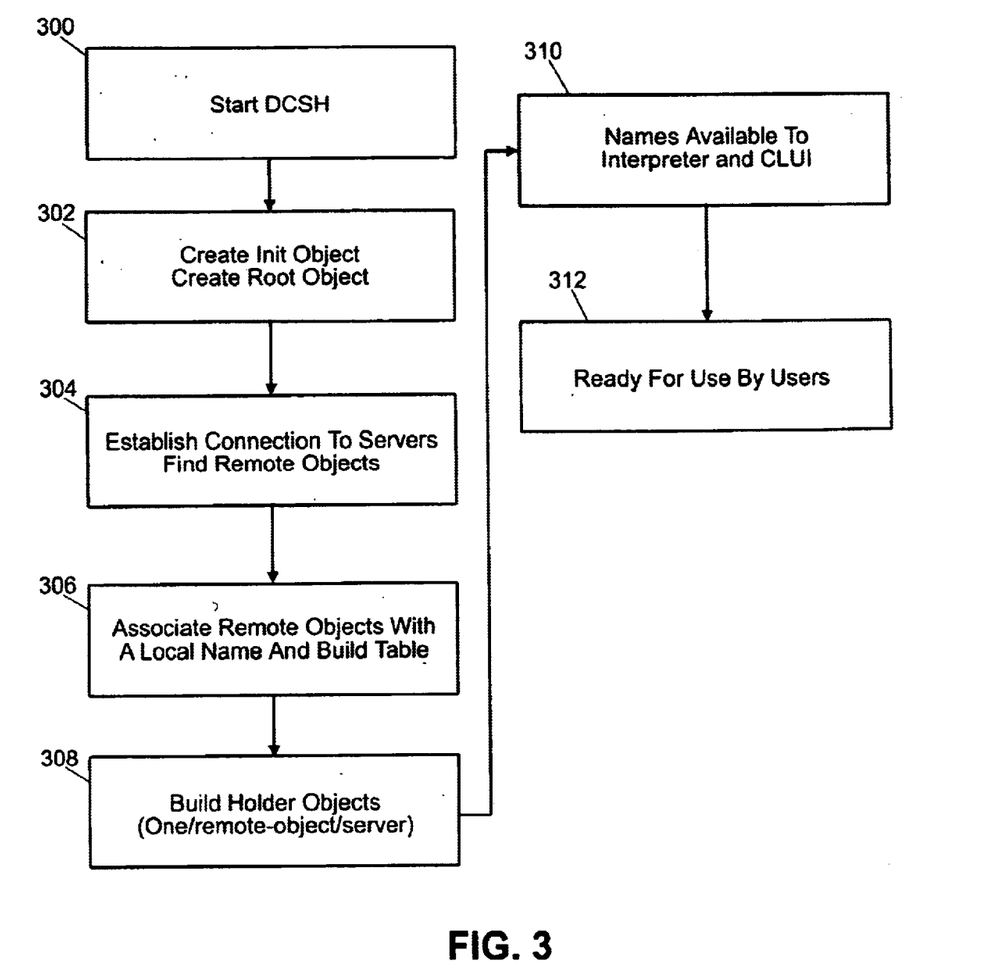
FIG. 3 is an initialization method for a distributed command shell according to the present invention.

Referring now to FIG. 3, one method of initializing the DCSH is shown. A system administrator or other user starts the DCSH program in 300. One of the early tasks the initialization process carries out is shown in 302, creating a set of root objects. An important part of the start up process is to establish connections with servers using the information in the root objects is shown in 304. If a connection with a server corresponding with a root object can not be established when the DCSH is first started, then the DCSH must abort with appropriate error message and the user must resolve the problem. Once the DCSH is running, if a server stops responding to requests after successfully responding to at least one DCSH request, then the DCSH will purge the name-object table it maintains for that server and must start from beginning by talking to the root object(s) of that server. A particular DCSH implementation may be designed for use with one server or an arbitrary number of servers. In the case of a DCSH implementation being in contact with more than one server, only the name-object table entries for the server not responding to the DCSH's requests need to be purged and rebuilt (if there is one table), or the table corresponding to the non-responsive server is deleted and rebuilt (if there is a table for each server). Rebuilding the table or table entries starts as soon as a connection is reestablished with the non-responsive server.

Once a connection with a remote server is established, the DCSH can allow creation of holder objects for other server objects. These are the public objects, usable by remote clients (not all objects on a server, nor all methods and functions of any particular object, may be seen or used outside the server). Proceeding to 306, the DCSH builds a name-object table, which associates a name with a pointer to a holder object. The name in the name-object table will allow users to invoke the remote object using the name as a command on a command line. Proceeding to 308, the DCSH then finishes building holder objects for each entry in the name-object table. The holder object has all the information needed to invoke or use the remote object. This includes, amongst other information, the methods and functions available on the remote object, the syntax needed to interface with the remote object, and its location on the net connecting the remote object and the DCSH.

Once the name-object table has been built and the holder object instantiated with the needed information about the remote object, the name can be found by the interpreter, box 310. Once the name and its associated holder object can be found by the interpreter, the process of initialization completes at 312, where the name can now be used to call remote objects and use their methods and functions by users. Use by users includes both CLUI use and the running of script files.

Figure 4:
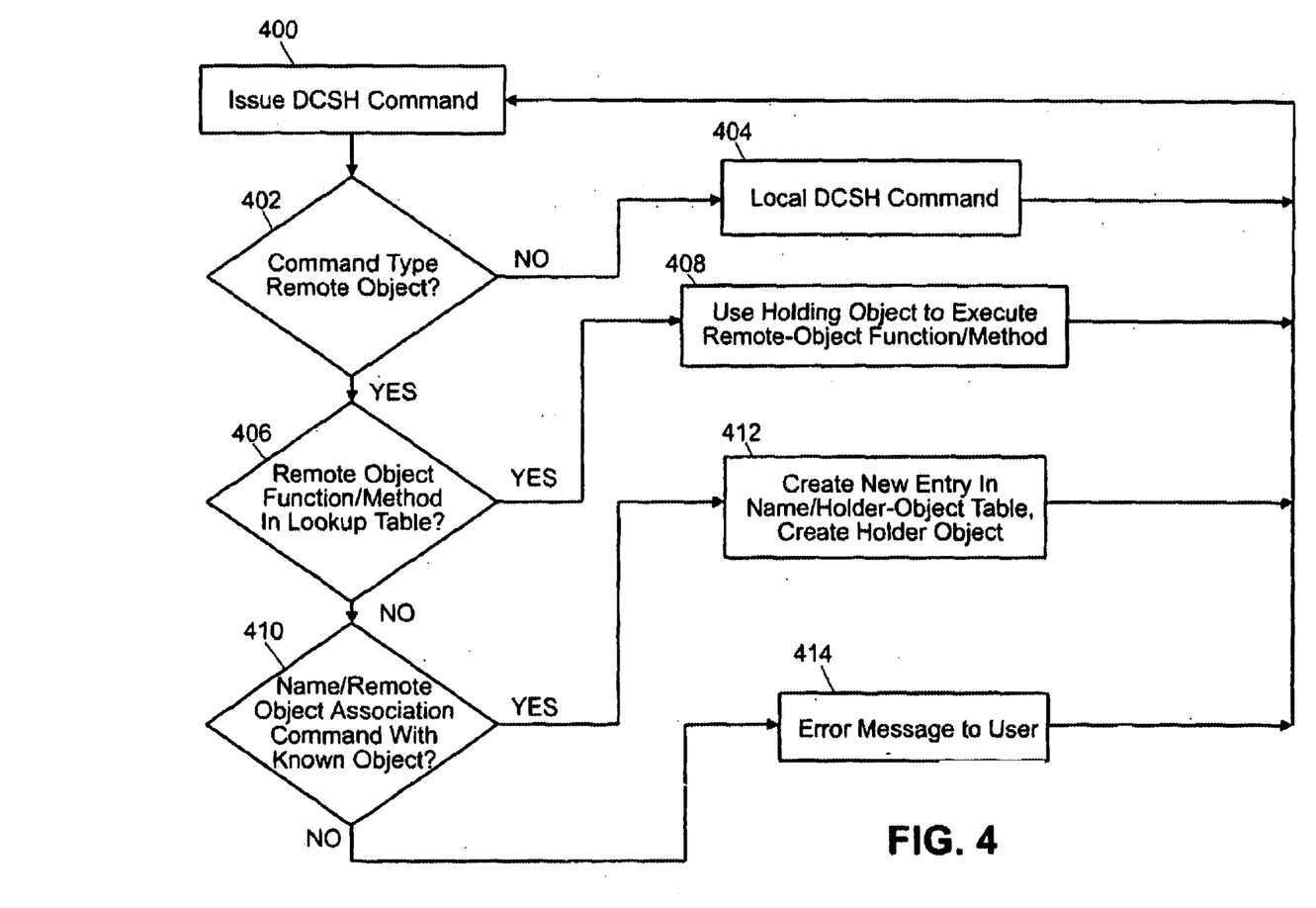
FIG. 4 is a method of using the present invention.

A method of using the DCSH is shown in FIG. 4. The first action box, 400, is ready to receive commands. When a user issues a command at the CLUI or when a line from a script is read into the interpreter, box 400 receives them. Decision point 402 determines if the command line starts with the command name equivalent for a remote object. If the answer is NO, then the command is a normal, local command and is handled in box 404 like any normal command by the interpreter. After handling the local command, flow proceeds from 404 back to box 400, ready to accept the next command.

If the answer is YES at decision point 402, then the command is a remote object command and decision point 406 entered. The command name and the command parameters are compared to what is known about the remote object. If the command and parameters correspond to known methods or functions of a known remote object, the YES branch to box 408 is taken. In box 408 a syntactically correct request is composed for the remote object, using information stored inside the holder object. The composed request is then sent to the remote object, again using information in the holder object. Any results or status are passed back to the user. The flow would then continue back to box 400, ready to accept the next command line.

Returning to decision point 406, if the remote object, method, or function is not known the NO branch is taken to decision point 410. There, the command is checked to see if it is a command to create a new entry in the name/holder-object (or name-object) table. If it is, and the requested public object is known to the DCSH through one of the root objects, and the requested name is unique (all the names in name/holder-object table must be unique—no name clashes are allowed), then the "YES" branch is taken from decision point 410 and box 412 is entered. There, the new name is entered into the table and the associated holder object is created, with a pointer from the name table to the new holder object. It is this command type that provides for dynamic, real-time (from the user's perspective) creation of new commands corresponding to public objects at will. This is a very powerful aspect of the present invention. In a typical implementation of the DCSH, the user will know the action has been successful by the issuing of a command prompt without error messages. After the name/holder-object table is modified and the holder object created, flow returns to box 400, ready to accept another command line.

Finally, if the answer in decision point 410 is no, the "NO" exit is taken to box 414. An error message is sent to the user to correct the command line with an indication of where the error is (object name or object method/function). From there, flow returns to box 400, ready to accept another command line.

The present invention has been partially described through the use of a flow chart. As is appreciated by those of ordinary skill in the art and with the benefit of the present disclosure, the procedures described herein may be repeated as continuously, as often, or as little as necessary to satisfy the needs described and details or order of steps may vary without departing from the basic concepts of the present invention.

The DCSH uses a computer system configured to act as a client and having standard hardware components as are well known in the art. The present invention is embodied in various machine readable media on the client system, on which are stored programs, data, and data structures. It is contemplated that any media suitable for using the program and its accompanying data and data structures is within the scope of the present invention. Examples would include memory and other relatively fast-access semiconductor media, as well as magnetic or optical secondary storage media.

While embodiments and applications of this invention have been shown and described, it will be apparent to those or ordinary skill in the art and with the benefit of the present disclosure that many more modifications than mentioned above are possible without departing from the inventive concepts contained herein. The invention, therefore, is not to be restricted except in the spirit of the associated claims.

What is claimed is:

1. In a computing device structured and configured to interface with public objects, an object interfacing command shell comprising:
   a command line interface module enabled to accept input and send output;
   a central module further including an interpreter configured to be in operable communication with said command line interface module, wherein said interpreter parses said input into a plurality of commands;
   at least one holder object, where each of said at least one holder object is associated with a unique name, and where each of said at least one holder object contains information about a public object;
   said central module further configured to receive said plurality of commands from said command line interface module, where a subset of said plurality of commands further comprise one of said unique names associated with said holder objects, allowing access to a public object thereby; and
   a boot module, configured to run only when said object interfacing command shell is first started;
   at least one root object where each of said at least one root object is configured to be accessible to said central module and where each of said at least one root object contains information about public objects on a server and where said at least one root object is created by said boot module;
   a holder object creation module, configured to accept a unique name and a public object from said central module, and further configured to use one of said at least one root object associated with said public object to create a holder object associated with said unique name, and make available at said command line interface module said unique name as one of said subset of commands.

2. The object interfacing command shell of claim 1 where said at least one holder object further comprise at least one local holder object containing information about a local public object, and at least one remote holder object contain information about a remote public object.

3. In a computing device structured and configured to communicate with public objects, a method of interfacing to public objects comprising:
   (a) receiving a command containing a name associated with a public object;
   (b) sending a result of an interaction with said public object;
   (c) parsing said command into a name portion and a public object portion;
   (d) checking the validity of said name portion and said public object portion using information in a root object;
   (e) sending an error message and terminating when said name portion is invalid;
   (f) sending an error message and terminating when said public object portion is invalid;
   (g) continuing when said name portion and said public object portion are valid;
   (h) creating a holder object for said public object;
   (i) creating an entry in a name-object table associating said name and said holder object for said public object;
   (j) sending a response and terminating; and
   (k) running a boot module only when an object interfacing command shell is first started.

4. The method of claim 3 further comprising:
   (a) parsing said command into a name portion and a parameter portion;
   (b) checking the validity of said name portion and said parameter portion using information in a name-object table and an associated holder object;
   (c) sending an error message and terminating when said name portion is invalid;
   (d) sending an error message and terminating when said parameter portion is invalid;
   (e) continuing when said name portion and said parameter portion are valid;
   (f) issuing a syntactically correct request to a public object associated with said holder object;
   (g) receiving a response from said public object;
   (h) sending said response and terminating.

5. A program storage device readable by a machine, tangibly embodying a program of instructions executable by the machine to perform a method for interfacing to public objects, said method comprising:
   (a) receiving a command containing a name associated with a public object;
   (b) sending a result of an interaction with said public object; parsing said command into a name portion and a public object portion;
   (c) checking the validity of said name portion and said public object portion using information in a root object;
   (d) sending an error message and terminating when said name portion is invalid;
   (e) sending an error message and terminating when said public object portion is invalid;
   (f) continuing when said name portion and said public object portion are valid;
   (g) creating a holder object for said public object;
   (h) creating an entry in a name-object table associating said name and said holder object for said public object;
   (i) sending a response and terminating; and
   (j) running a boot module only when an object interfacing command shell is first started.

6. The program storage device of claim 5, said method further comprising:
   (a) parsing said command into a name portion and a parameter portion;
   (b) checking the validity of said name portion and said parameter portion using information in a name-object table and an associated holder object;
   (c) sending an error message and terminating when said name portion is invalid;
   (d) sending an error message and terminating when said parameter portion is invalid;
   (e) continuing when said name portion and said parameter portion are valid;
   (f) issuing a syntactically correct request to a public object associated with said holder object;
   (g) receiving a response from said public object;
   (h) sending said response and terminating.

7. In a computing device structured and configured to communicate with public objects, an object interfacing command shell comprising:
   means for receiving commands containing a name associated with a public object; and,
   means for sending results of an interaction with said public object;

means for parsing said command into a name portion and a public object portion;

means for establishing the validity of said name portion and said public object portion using information in a root object;

means for sending an error message and terminating when any portion of said command is invalid;

means of creating a holder object for said public object;

means of entering a new entry in a name-object table associating said name and said holder object for said public object;

means for running a boot module only when an object interfacing command shell is first started and;

means for sending a success-indicator response and terminating.

8. The object interfacing command shell of claim 7 further comprising:

means for parsing said command into a name portion and a parameter portion;

means for establishing the validity of said name portion and said parameter portion using information in a name-object table and an associated holder object;

means for sending an error message and terminating when any portion of said command is invalid;

means for issuing a syntactically correct request to a public object associated with said holder object;

means for receiving a response from said public object; and, means for sending said response and terminating.

9. A device including a memory and a processor wherein the processor is configured to perform the acts comprising:

(a) receiving a command containing a name associated with a public object;

(b) sending a result of an interaction with said public object;

(c) parsing said command into a name portion and a public object portion;

(d) checking the validity of said name portion and said public object portion using information in a root object;

(e) sending an error message and terminating when said name portion is invalid;

(f) sending an error message and terminating when said public object portion is invalid;

(g) continuing when said name portion and said public object portion are valid;

(h) creating a holder object for said public object;

(h) creating an entry in a name-object table associating said name and said holder object for said public object;

(i) sending a response and terminating: and (j) running a boot module only when an object interfacing command shell is first started.

10. The device of claim 9 further configured to perform the acts comprising:

(a) parsing said command into a name portion and a parameter portion;

(b) checking the validity of said name portion and said parameter portion using information in a name-object table and an associated holder object;

(c) sending an error message and terminating when said name portion is invalid;

(d) sending an error message and terminating when said parameter portion is invalid;

(e) continuing when said name portion and said parameter portion are valid;

(f) issuing a syntactically correct request to a public object associated with said holder object;

(g) receiving a response from said public object;

(h) sending said response and terminating.

* * * * *